United States Patent [19]
Schifalacqua

[11] 3,755,727
[45] Aug. 28, 1973

[54] CONTROL SYSTEM FOR STEPPING MOTORS

[75] Inventor: Italo H. Schifalacqua, Drexel Hill, Pa.

[73] Assignee: Burroughs Corporation, Detroit, Mich.

[22] Filed: Jan. 31, 1972

[21] Appl. No.: 222,215

[52] U.S. Cl.................. 318/696, 318/696, 318/466
[51] Int. Cl. ......................................... H02k 37/00
[58] Field of Search.................... 318/138, 254, 676, 318/685, 466, 467, 468

[56] References Cited
UNITED STATES PATENTS

| | | | |
|---|---|---|---|
| 3,423,658 | 1/1969 | Barrus............................ | 318/696 |
| 3,345,547 | 10/1967 | Dunne ............................ | 318/696 |
| 3,523,230 | 8/1970 | York............................... | 318/696 |
| 3,660,746 | 5/1972 | Milek.............................. | 318/696 |
| 3,636,429 | 1/1972 | Pawletko et al. .................. | 318/696 |
| 3,626,269 | 12/1971 | Stanley ............................ | 318/696 |
| 3,588,661 | 6/1971 | Newell............................. | 318/696 |
| 3,328,658 | 6/1967 | Thompson ....................... | 318/415 |

Primary Examiner—G. R. Simmons
Attorney—Edward J. Feeney, Jr.

[57] ABSTRACT

A control system for use with stepping motors is provided which eliminates the oscillations occurring at the end of each discrete step of motor operation. In applications where the travel limits are restrained by physical stops, the present system avoids the impact and the resultant noise which would normally occur at such limits, and insures a longer life for the associated components. The control system accomplishes these objectives by permitting acceleration for an initial increment of travel in any given step, deceleration in the final increment of travel, and holding torque in the limit positions.

16 Claims, 8 Drawing Figures

CONTROL SYSTEM FOR STEPPING MOTORS

BACKGROUND OF THE INVENTION

Stepping motors in which the motor spindle or shaft rotates in discrete steps in response to electrical energy applied to its stator windings, are well known and have been used in a variety of applications. The present invention resulted from the use of such motors in high speed diverting gates employed with document transport systems for mail processing. In this last application, each gate under control of the system logis is required to operate through an arc of 15°, the gate being closed at one end of its travel, and open at the other end to receive any documents destined to pass therethrough into an associated storage receptacle. In an actual operating mail processing system, over 800 of such gates are employed. A solution to the problem of eliminating, insofar as possible, the noise associated with the opening and closing of such a large number of gates, together with the excessive wear on the gate members, was sought. A first consideration was to employ stepping motors designed to operate with multiple steps of smaller stepping angles to achieve a required 15° arc, rather than stepping motors in which the entire travel was made in a single step. However, the use of such stepping motors greatly increases the control circuits required for their operation, thereby substantially increasing the cost of the system.

Torque motors were also considered for use but were eliminated because the electronic controls are considerably more costly, and the need for positive stops would result in impact noise and reduced life. Rotary solenoids, likewise were found to be unusable because of impact noise and limited life expectancy.

The impact and resulting noise associated with the use of stepping motors in the aforementioned system, stems from the oscillations which normally occur in the motor shaft at the end of each step travel. In order to dampen these oscillations, several methods were attempted with little or no success. These methods included the use of dash pots, stops fitted with absorbers, frictional means and sequencing methods. The dash pot approach was found to be too costly and of limited life expectancy. The shock absorbers did not satisfactorily eliminate the noise and shock, while the frictional means provided too erratic and unreliable operation. The sequencer method also proved too costly for the large numbers of gates involved, and the power consumption was excessive.

In accordance with the present invention, the characteristics of the stepping motor itself in combination with suitable control means provided the most feasible and economical method of eliminating the oscillation problem. It should be noted that while the inventive concepts described and claimed herein are particularly well suited for the mail processing system mentioned hereinbefore, and are described in terms of the system, such concepts are intended to encompass a wide variety of applications and not to be considered limited to any one of them.

Summary of the Invention

Briefly stated, the inventive concept taught herein eliminates the oscillations in stepping motor operation through the utilization of the same amount of energy to accelerate the stepping motor as to bring it to rest, less of course the frictional losses involved, which are small.

In operation, assume that the stepping motor shaft is to repose in one of two limit positions. Physical stops are placed at each of these positions so that if a gate member is attached to the motor shaft (the latter being coupled to the rotor of the stepping motor), its motion is confined therebetween. With selected phases of the stepping motor energized, the stepping motor's housing is manually rotated until the shaft or gate member is positioned midway between the stops which position corresponds to the null or zero torque position of the energization.

Through the selective energization of the phases of the stepping motor in the manner and sequence to be described in detail hereinafter, the gate may be moved from one of the stops, corresponding to the closed gate position, to the other stop, which is the open gate position. Thus, the gate may be moved from a closed position toward its open position by energizing predetermined phases of the motor with a high level signal pulse of suitable duration. The gate then moves toward the midpoint position between the stops with diinishing torque - the torque being substantially zero at the midpoint. Beyond the midpoint position, the gate is slowed down by increasing torque in the reverse direction. As the gate velocity approaches zero, the last-mentioned high level pulse is terminated and the appropriate phases of the motor are pulsed with a low level signal to bring the gate to its open position and to hold it against the stop. Refinements of the basic operation may be made if necessary to compensate for the frictional and unbalanced gravitational loads introduced by the member driven by the motor. Such refinements as well as other features and advantages of the invention are included in the detailed description appearing hereinafter.

DESCRIPTION OF THE PREFERRED EMBODIMENTS

As indicated previously, the inherent characteristics of the stepping motor itself are exploited by the present invention. For this reason, it is believed helpful to review the features of stepping motors which determine their basic behavior. These features include torque versus angular displacement, frictional forces (bearings, windage, eddy currents, etc.), rotor inertia, and the inductance-resistance electrical time constant.

Figure 1:
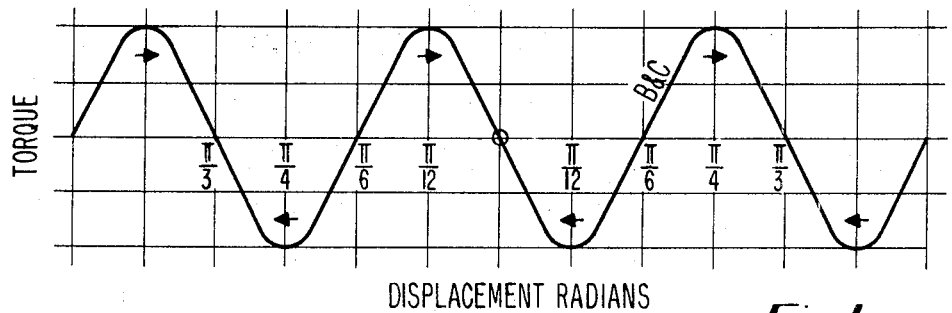
FIG. 1 is a curve representing torque versus angular displacement for a stepping motor with selected phase windings energized.

FIG. 1 represents a typical torque versus angular displacement curve for a four-phase, fifteen degree stepping motor with two of its phases, designated respectively B and C, energized with an applied voltage of +28 volts dc. The units of torque in FIG. 1 are ounce-inches, and those of displacement are radians. The direction of torque is indicated by the arrows. It should be noted that for a stepping motor having four phases and 15° steps, there will be six true nulls (one for every 60°) and six false nulls for each revolution of the rotor. The false nulls are unstable in that slight deviations from these nulls causes the torque of the motor to drive the rotor toward the nearest true null. FIG. 1 also indicates that between $-\pi/6$ to $+\pi/6$ the torque is opposite in the direction of displacement, which is similar to the behavior of a pendulum. The curve of FIG. 1 can be expressed by Fourier's series as follows:

$$T = -\Sigma(A_0 \sin K\theta_1 + A_1 \sin 2K\theta_2 - - - + A_{m-1} \sin nK\theta_m$$

where:
K = 6 for 15° stepping motors
$\theta$ = angle in radians
$A_0$ = constant (motor stiffness)

For simplicity of analysis the first term only may be considered and for small angles:

$$T = -A_0 \sin K\theta_1$$

In a steady state condition where the voltage and displacement are held constant, a restoring torque is created which is proportional to the flux ($\phi$) of the stator and rotor. The flux is proportional to the number of ampere turns, NI, so that an increase in voltage will result in an increase of current. Thus, an increase in flux results in an increase of restoring torque. This effect is explicity expressed in the term $A_0$. Unfortunately, above the rated voltage, the ampere turns of the stepping motor will pass the knee of the flux versus NI curve for that particular motor. Thus, it can be shown that for the application of twice the rated current, the resultant flux may be only ten to twenty percent greater than that flux resulting from the application of rated current. The resulting restoring torque for an increase of 100 percent voltage over the rated voltage will be only 10 to 20 percent more than its rated torque obtained at rated voltage. Therefore:

$$A_0^x \; \phi$$

$\phi = N \; f(I)$ where N is constant for a given design.

For example, the four-phase motor chosen for purpose of illustration has 45 ounce-inch torque at 28 volts dc, and at an angular displacement of 15°. Increasing the voltage to 56 volts dc, and keeping the 15° angular displacement, an increase of 15 percent torque, that is, up to 52 ounce inches may be expected. Obviously the operation of the motor just below the knee of the NI versus flux curve gives the maximum economy for the best performance. This is typical of all motors.

The second feature of stepping motors to receive consideration was that of frictional forces. In general, these forces are very low for stepping motors and only come into consideration because the inertias of such motors are also very small. However in the present analysis this term will be neglected because the inertial load that the stepping motor normally drives is at least one magnitude greater than the external frictional load.

Another constant within the stepping motor which deserves consideration is that of the inductance/resistance (L/R) time constant. This time constant can be significant but can be reduced to minimal delays. It should be noted that the time constant will vary according to the angular displacement of the motor. As is to be expected, when the poles of the motor are opposite, as for example at zero degree displacement, the gap and magnetic path are minimal, thus giving maximum inductance. At 30° displacement, the gap and magnetic path are maximum, thus giving minimum inductance. The above function can also be expressed in a Fourier series, namely:

$$L = \Sigma(A_0 + A_1 \cos K\theta_1 + A_2 \cos 2K\theta_2 + - - - A_n \cos (n) K\theta_n$$

where $K = 6$

Again, in order to simplify, and considering only small angles:

$$L = \Sigma(A_0 + A_1 + A_2 + A_3 + - - A_n) = A_x.$$

This represents the maximum value of L whilch occurs at:

$$\theta = 0; \pm \pi16; \pm \pi/3 - - - \pm n\pi/6$$

A representative circuit for the stepping motor would include the series relationship of the dc resistance, R, and the unductance, L, of the phase winding. With a step input voltage, $E_{in}$, the current response may be represented by the mathematical expression:

$$I = E_{in}/R \; (1 - e \; (R/t))$$

Figure 2:
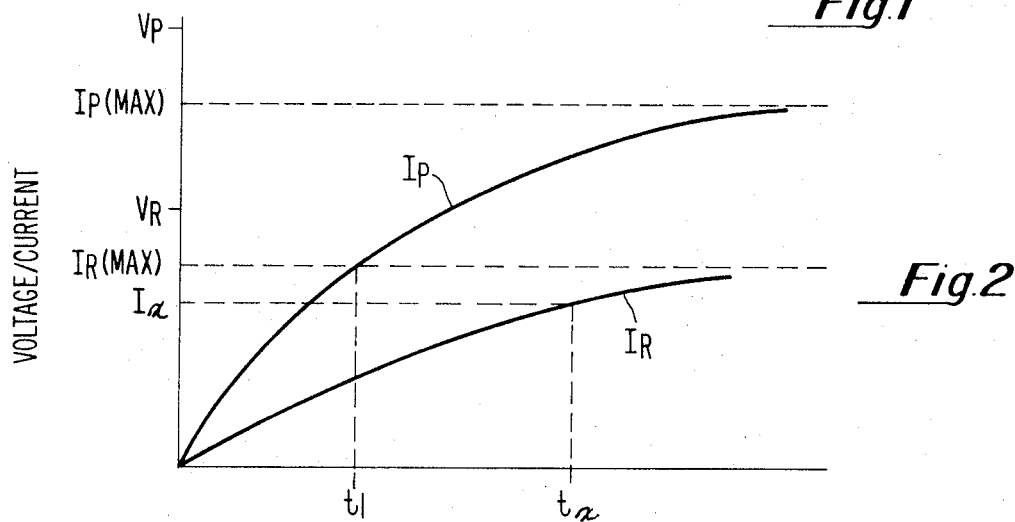
FIG. 2 is a graph of time versus voltage nnd current relationships present during the energization of the motor windings.

FIG. 2 depicts voltage/current relationships in the stepping motor with particular emphasis on the time required to reach rated current with applied voltage. Ideally, a high level pulsed voltage $V_P$ would be applied for a time $t_1$ and then diminished to the rated voltage $V_R$ level for the steady-state condition. In FIG. 2, $I_x$ represents a value of current corresponding to 90 percent of the maximum rated current, $I_{R(max)}$. Thus, $t_x$ is the time it takes the current $I_R$ to reach the value $I_x$ with the rated voltage $V_R$ applied initially to the motor windings and maintained at that level. On the other hand, if $V_P$ is applied, the current curve $I_P$ is generated. If the $V_P$ amplitude is immediately diminished to $V_R$ when $I_P$ crosses over the $I_{R(max)}$ level, rated current and thus rated torque on the motor may be achieved at time $t_1$. This time may be computed in accordance with the following mathematical relationships:

$$I_x = \frac{XV_R}{R} = \frac{V_R}{R}\left[1 - e^{\frac{-Rt_x}{L}}\right]$$

$$t_x = -(L)/(R)\ln[1 - \overline{X}]$$

$$I_P = \frac{V_R}{R} = \frac{V_P}{R}\left[1 - e^{\frac{-Rt_1}{L}}\right]$$

$$t_1 = -L/R \ln[1 - (V_R)/(V_P)]$$

$$\frac{t_1}{t_x} = \frac{\ln\left[1 - \frac{V_R}{V_P}\right]}{\ln[1-X]} = \frac{\log_{10}\left[1 - \frac{V_R}{V_P}\right]}{\log_{10}[1-X]}$$

On the basis of the rated current reaching 90 percent of its maximum current, and for the ratios of $V_R$ to $V_P$ the corresponding time to achieve this level is given in the following table.

| $V_R/V_P$ | 1.0 | .9 | .8 | .7 | .6 | .5 | .4 | .3 | .2 |
|---|---|---|---|---|---|---|---|---|---|
| $t_1/t_x$ | ∞ | 1.00 | .699 | .523 | .398 | .301 | .222 | .155 | .097 |

Thus if $V_P$ is twice $V_R$, so that $V_R/V_P$ is .5, the rated current $I_R$ can be achieved in 301 of the time it would take to achieve 90 percent of the rated current when the rated voltage $V_R$ is applied. For example, consider a typical 3-phase stepping motor which has a maximum inductance of 45 mh. and a resistance of 15 ohms per phase. The inductance/resistance time constant is 0.003 seconds. To achieve one time constant (62 percent of the value), $t$ must be equal to 0.003 second. To achieve 90 percent of the value $I_R$ (max), $t = 0.007$ seconds. Doubling the applied voltage yields the full rated $I_R$ (max) in 0.001 seconds.

The characteristic equation for a stepping motor is as follows:

$$J_0 \ddot{\theta} + F\dot{\theta} = -K\theta \text{ for small angles,}$$

where:
J = rotor inertia
F = frictional force
K = stiffness

This assumes that the $K\theta$ term is achieved instantly, which is not true.

$$\theta = e^{-\frac{F}{2J_0}t}\left[A_1 e^{\sqrt{\frac{F^2}{4J_0^2} - \frac{K}{J_0}}t} + B_1 e^{-\sqrt{\frac{F^2}{4J_0^2} - \frac{K}{J_0}}t}\right]$$

All the cases when $t = 0$, $\theta$ is in its maximum displaced position:

$$\theta_m = A_1 + B_1$$

where: $\theta_m$ is the maximum amplitude
Also $\dot{\theta}$ is equal to 0 at $t = 0$ $$O = A_1 \sqrt{(F_2/4J^2) - (K)/(J_0)} - B_1 \sqrt{(F_2)/(4J^2) - (K)/(J_0)} \text{ gives:}$$

$$A_1 = B_1.$$

Therefore: $A_1 = \theta m/2$ and $B_1 = \theta m/2$ v,35/10

$$\theta = \frac{\theta m}{2} e^{-\frac{F}{2J_0}t}\left[e^{\sqrt{\frac{F^2}{4J_0^2} - \frac{K}{J_0}}t} + e^{-\sqrt{\frac{F^2}{4J_0^2} - \frac{K}{J_0}}t}\right]$$

There are three cases to consider: First, undamped, when $F = 0$ $$\theta = \frac{\theta m}{2}\left[e^{\sqrt{-\frac{K}{J_0}}t} + e^{-\sqrt{-\frac{K}{J_0}}t}\right]$$

$$\theta = \theta_m \cos \sqrt{(K/J_0)} t$$

Second, damped, when $(K)/(J_0) > (F^2)/(4J_0^2)$ $$\theta = (\theta m)/(2) e^{-[(F)/(2J_0)]t} \cos \sqrt{[(F^2)/(4J_0^2) - (K)/(J_0)]} t$$

Third, critically damped, where: $(K)/(J_0) = (F^2)/(4J_0^2)$ $$\theta = (\theta m/2) e^{-[(F/2J_0)]t} [1 - t]$$

A fourth case, overdamped (too slow response), is not of interest:

$$(F^2)/4J_0^2) > (K/J_0)$$

The second case given above is the usual case and the one of primary interest. The solution while directed to the stepping motor itself can be extended to include the gate member attached to the motor shaft if $J_0$ is made to include the inertia of the gate and if $F$ includes all of the friction in the system. The $K$ term does not change because there are no external forces acting on the system. The differential equation for the system is:

$$J_S\ddot{\theta} + F_S\dot{\theta} + K\theta = 0$$

Since the gate inertia and frictional load to the stepping motor will not change the basic differential equation, several methods of damping the motor oscillations were attempted as noted hereinbefore: All of these methods were discarded in favor of using the motor characteristics themselves to accomplish the damping.

Figure 3:
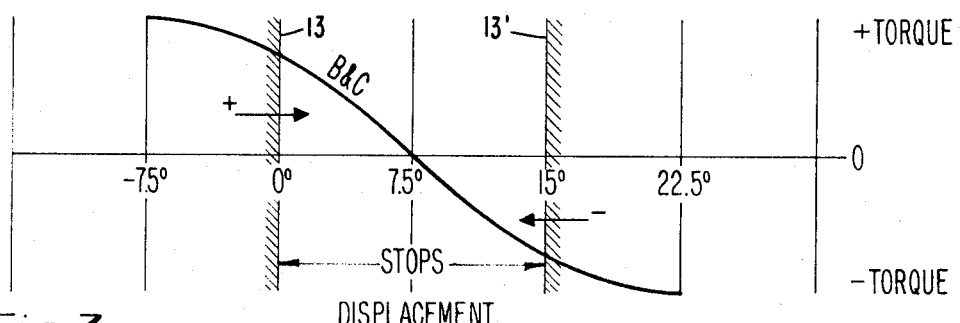
FIG. 3 is a torque versus displacement curve for a stepping motor arranged to operate between fixed limits and with selected windings energized.

Assume for purposes of explanation that a 4-phase, 15° stepping motor is to be used, and that the rotor, or gate member affixed thereto is to repose in one of two positions, namely 0° or 15°. As illustrated in FIG. 3, if stops 13 and 13' are placed at these positions so that the gate can move only between 0° and 15° and be held at either position, the gate motion is thereby confined. The motor phases, or coils, are designated respectively A, B, C and D. If phases B and C of the stepping motor are energized and its housing to which the stators are attached is turned until the gate rests at the 7.5° point (the B and C torque null point), which is midway between the stop positions, the torque versus displacement curve of FIG. 3 for phases B, C, energized is derived. This relationship of the stator housing to the rotor or gate member is described in greater detail hereinafter in connection with FIG. 5.

Figure 4:
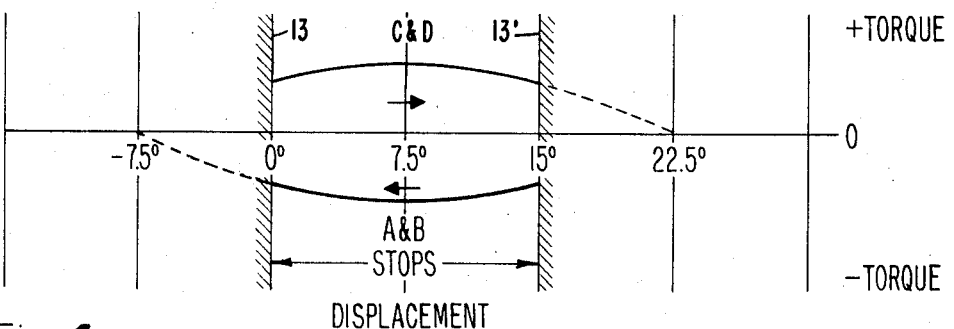
FIG. 4 depicts two curves of torque versus displacement for the same motor as in FIG. 3, but with different respective motor windings energized.

FIG. 4 illustrates the torque versus displacement curves for the same motor when respective pairs of phases A, B and C, D are energized. With reference to FIGS. 3 and 4, when coils A and B are energized by application of rated voltage thereto, the gate will move toward the 7.5° rest position but will be restrained by the physical stop 13 at the 0° position, and will be held there by the torque created by A and B. The arrows indicate the direction of torque applied to the motor shaft. The gate may be moved to the 15° position by de-energizing coil A and pulsing coils B and C with more than double the rated voltage. This operation sends the gate moving toward 7.5° with diminishing torque. At 7.5°, the torque starts increasing in the reverse direction of velocity. This will be apparent from the magnitude and direction of the torque as seen in FIG. 3 for the gate travel 7.5° to 15°. The gate slows down and as it approaches zero velocity, the energization of coils B and C is terminated, and coils C and D are energized with rated voltage. This tends to drive the gate to the rest position at 22.5°, but physical stop 13' prevents motion beyond the 15° position. The torque generated by C and D causes the gate to contact the stop 13', and holds the gate against the stop.

The operation of a stepping motor in the manner described may be applied as well to 3-phase motors and to motors having pluralities of phases which are multiples of 3 or 4. For example, a 3-phase motor having coils designated A, B and C may be operated in the following manner. As before, the motor housing is positioned such that the torque applied to the shaft or gate, will be at a null approximately midway between the travelled distance. Energizing phase A with a low level signal moves the gate to one of the stop positions, for example, the closed gate position, and holds it there. To open the gate, phase A is de-energized and coil B is energized with a high-level signal. The gate moves toward the midpoint position with diminishing torque and beyond the midpoint, approaches zero velocity due to a reverse torque. At this time, the energization of coil B is terminated and coil C is energized by a low level signal, thereby causing the gate to move to and be held against, the other stop position, at which position the gate is open.

Figure 5:
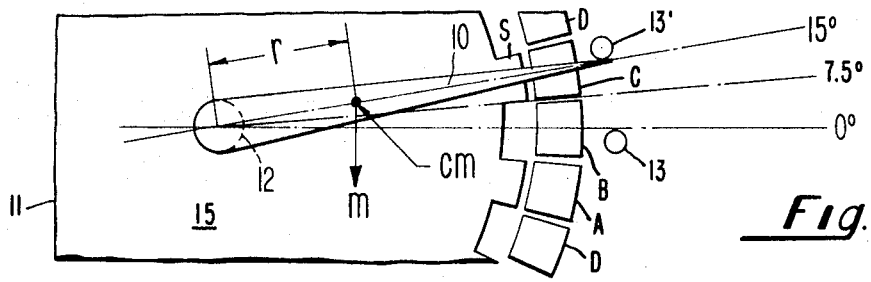
FIG. 5 illustrates the effect of an external torque upon a gate member attached to the motor shaft.

FIG. 5 illustrates in particular fashion a gate member 10 affixed to the shaft 12 of a conventional stepping motor 15 of the type described hereinbefore. The shaft 12 is coupled to the rotor 11 of the stepping motor 15. The rotor 11 includes a plurality of permanent magnets, one of which is illustrated in FIG. 5 as being poled in the "S" direction. The stator includes a plurality of pole pieces identified by the coils A, B, C and D wound thereon for developing magnetic fields adapted to interact with the forces produced by the rotor magnets.

The condition depicted in FIG. 5 is that described hereinbefore in connection with FIG. 4 and illustrated therein, namely coils C and D are energized to produce a magnetic field poled in the "N" direction and the resultant torque holds gate member 10 firmly against the upper stop 13'. In the absence of the stop 13', the magnetic field provided by the concurrent energization of C and D would cause the center line of the rotor "S" magnet to align itself with the center of the gap between the C and D coils, which corresponds to the 22.5° point in FIG. 4. At this point, the torque provided by C and D would be zero, as indicated by the dashed extension of the C and D curve of FIG. 4, and the rotor would assume a rest position.

In a similar manner and in accordance with the operational steps hereinbefore described in connection with FIGS. 3 and 4, energization of coils A and B impresses a torque upon the rotor 11, and the gate member 10 coupled thereto is caused to contact and be firmly held against the stop 13. Because of stop 13, the rotor "S" magnet is prevented from assuming a rest position symmetrical about the center line of the gap between coils A and B, which corresponds to the −7.5° point in FIG. 4. At this point the torque on the rotor is zero, as indicated by the dashed extension of the torque curve for A and B in FIG. 4.

FIG. 5 illustrates the physical positioning of the stator housing which corresponds to the displacement/torque characteristics illustrated in FIG. 3. The B and C coils of the stator are positioned such that the center of the gap therebetween is substantially at the midpoint of travel of the gate member 10 between the stops 13 and 13'. As depicted in FIG. 3, wherein the angular distance between the stops is chosen as 15°, the torque on rotor 11 provided by the concurrent energization of coils B and C during initiation of movement of the rotor from one limit position to the opposite position is at a null or zero condition at the 7.5° point - the midpoint of the rotor/gate travel.

While the basic operation described hereinbefore is suitable for a wide variety of applications, a further refinement of the operation may be made to take care of gate frictional load and unbalanced gravitational loads. The magnitude of these parameters will of course depend on how the stepping motor is used. However, the following considerations will suggest to those skilled in the art, techniques for eliminating the effects of these loads.

With reference to FIG. 5, when the gate 10 is moving from 0° to 15°, it must overcome an external torque which is given $$T_E = mg \cdot r \cos \theta,$$

where "$m$" is the mass of gate, "$g$" is gravity and "$r$" is the radius of the center of mass ($cm$) of the gate to the axis of rotation.

Figure 6:
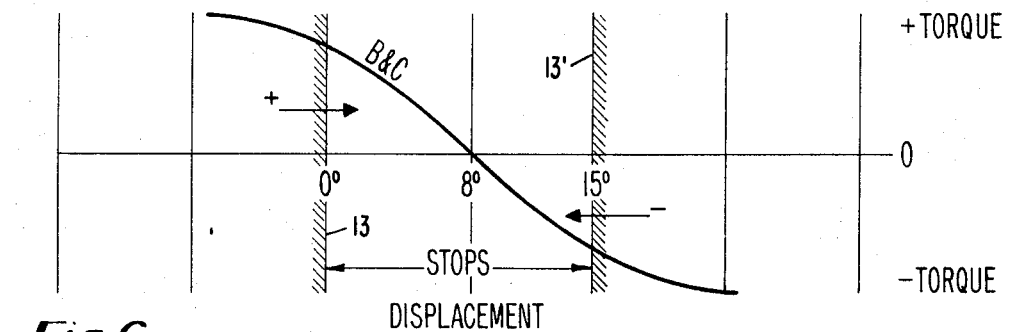
FIG. 6 is a torque versus displacement curve similar to that of FIG. 3 except that the torque null point has been shifted to the right to compensate for the unbalanced torque present in the system.

When the gate is moving from 15° to 0°, this external torque is added to the system. The effect of this unbalanced torque can be compensated for by shifting the null slightly to the right of the midpoint. In terms of the 15° stepping motor, and with reference to FIG. 6, the null would be shifted for example from 7.5° to 8°. This is equivalent to moving the 0° and 15° physical stops 13 and 13' respectively leftward. Stated another way, the shifting of the null is equivalent to the addition of a torque component directed upward so as to balance the downward $T_E$ torque. In this manner, the effect of gravity on the gate is minimized. A similar type of effect can be achieved by keeping coil D energized with a low voltage when the gate is moving from the 15° position to the 0° position, so as to shift the torque curve upward, thereby balancing the gravity component. Although this effect is slightly different from that achieved when the null is shifted, each method eliminates some of the unbalanced gravitational torque.

Frictional torque arising from the particular gate design was found to be easily overcome by selective energization of the D or A phases of the 4-phase motor, depending upon the direction of motion. This procedure produced the constant torque necessary to overcome the frictional torque, without the need for special control circuits.

A problem peculiar to the gate of FIG. 5 in the mail processing equipment mentioned hereinbefore occurs when heavy documents push against the open gate en route to the receptacle. The force of these documents is sufficiently great to flex the gate so that the torsional force released with the inertia of the gate, causes the gate to close. This condition was overcome by increasing the current in the motor windings that hold the gate open so that it would be restrained from breaking away from this position, unless directed by the system logic. Thus, it is apparent that the application of proper voltage levels in energizing the phases of the motor, together with the technique of offsetting the null point, provide the compensation needed to correct for the unbalanced forces operating on the gate.

Briefly, within the mode of stepping motor operation described previously, compensation for unbalanced forces may be provided by energizing the D phase when the B and C phases are being pulsed, and retaining the D energization in combination with that for C at the end of the 15° travel. Similarly, the A phase may be energized when B and C are active and the gate is moving toward the 0° position, ending with A and B phases energized to hold the gate against the 0° stop.

Having considered the gate functions, motions and forces, attention is now directed to the design of the stepping motor control circuits.

Figure 7:
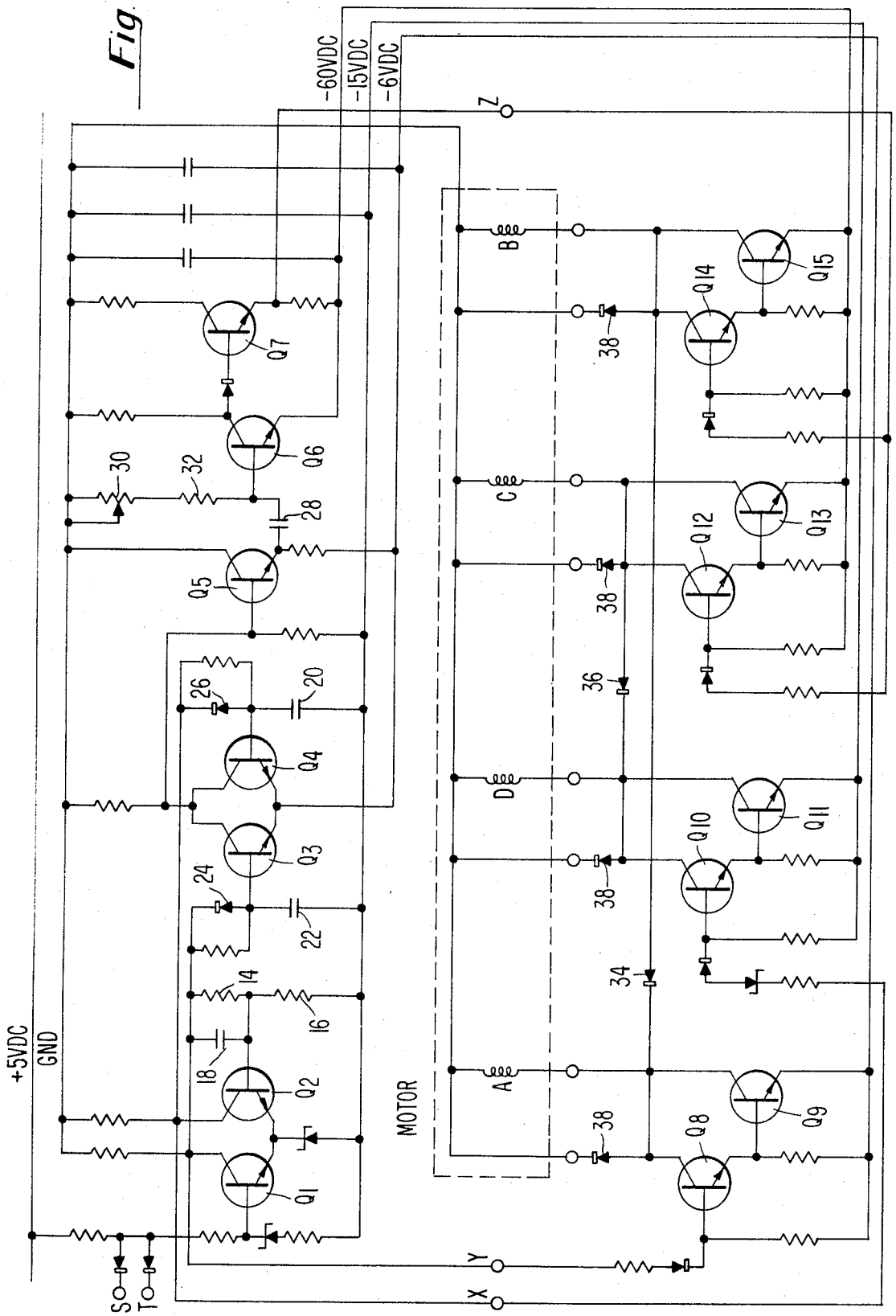
FIG. 7 is a schematic diagram depicting the amplifier and driver circuit portions of the control system, together with the associated motor windings energized thereby.

FIG. 7 is a schematic diagram of the amplifier and driver circuits which may be employed to realize the objects of the inventive concept. The driver circuit comprises a plurality of sections connected to selected phases of the stepping motor.

In the circuit of FIG. 7, two input terminals, S and T, are depicted. The S terminal is adapted to receive from the system logic a signal which is capable of inhibiting the gate operation, that is, maintaining the gate in a closed position while the storage receptacle associated therewith is being "swept" or emptied. The T terminal is adapted to receive from the system logic a signal having either one of two levels, which levels effectively determine whether the gate is to be open or closed. Also shown in the schematic of FIG. 7 are three output terminals designated X, Y and Z. These terminals are connected to the driver circuits in such a manner that the occurrence of a predetermined dc output level thereon results in the energization of selected stepping motor windings. Thus, in the embodiment of the invention described herein, a suitable level on the X terminal causes the driver to energize phases C and D of the motor and the gate member is in the open position. A suitable level on the Y terminal effects the energization of phases A and B - the gate being in a closed position. Similarly, the occurrence of a Z output pulse results in the energization of motor windings B and C for the time period that the pulse is present.

Figure 8:
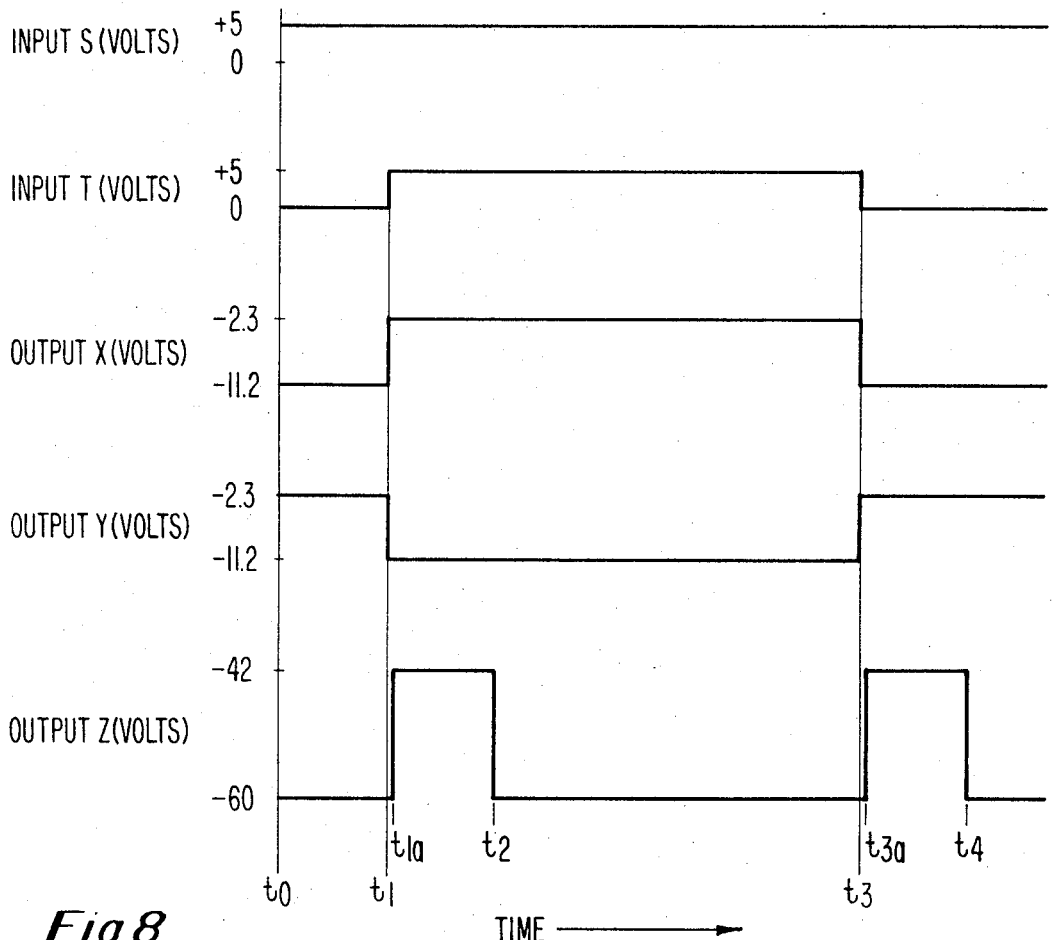
FIG. 8 is a waveform timing diagram for use with the control system components of FIG. 7.

The operation of the amplifier and driver circuits of FIG. 7 will now be described in detail. Reference should also be made to the timing and waveform diagrams of FIG. 8. It should be understood that the amplitudes of the various signals and supply voltages shown in FIG. 7, and the time periods shown in FIG. 8, are those occurring in an actual operative embodiment of the invention, and are presented herein solely for purpose of example. The actual parameters may vary depending upon particular operating requirements. For this reason, the invention is not to be considered limited to the parameters given herein.

Assume initially at time $t_0$ of FIG. 8 that the gate membe is closed, that is, that the stepping motor shaft is being held at its zero degree position. The logic signal under these conditions appearing on terminal T is at zero or ground level. The signal on terminal S is at its +5 volt level which indicates that no inhibiting is desired. Under these conditions, transistor $Q_1$ is nonconducting and the voltage on its collector electrode is approximately −2.3 volts. This potential appears on output terminal Y. As will be describe in greater detail hereinafter, this potential activates the driver circuit which in turn energizes phases A and B of the stepping motor. As noted hereinbefore, such energization causes the gate to be held at its closed or zero degree position. Transistor $Q_2$ is biased to conduction by virtue of the potential on its base electrode provided by the resistive divider comprised of resistors 14 and 16. The potential on the collector electrode of transistor $Q_2$ is approximately −11.2 volts and appears also on output terminal X. This voltage level is selected to be incapable of activating the driver circuit connected thereto. Capacitor 18 provides "speed-up" in the circuit response.

Transistors $Q_3$ and $Q_4$ form a pulse generating circuit in which either one or the other of the transistors is conducting. In the present case, transistor $Q_3$ is conducting because of the −2.3 volts on its base electrode, while transistor $Q_4$ is voltage on the common collectors of transistors $Q_3$ and $Q_4$ is about −5.4 volts. The base of transistor $Q_4$ is nonconducting and the capacitor 20 are at −11.2 volts. Transistor $Q_5$ is nonconducting and its emitter electrode is at −6 volts. Transistor $Q_6$ is conducting and transistor $Q_7$ is nonconducting. The voltage level on the emitter of transistor $Q_7$ is that of the −60 volt supply. This potential appears on output terminal Z, and is not of the proper level to activate the associated driver circuit.

It is further assumed that it is desired to open the gate to its 15° limit position. This is accomplished in accordance with the invention by applying a +5 volt signal to the T terminal, as shown at time $t_1$ in FIG. 8. The change of bias on transistor $Q_1$ resulting from the zero to +5 volt level change on terminal T causes transistor $Q_1$ to turn on. The collector of this last transistor goes negative, from −2.3 volts to −11.2 volts. This voltage level appearing on terminal Y terminates the activation of the driver circuits coupled thereto and phases A and B of the motor are no longer energized. Transistor $Q_2$ is now driven to nonconduction and its collector electrode rises from −11.2 volts to −2.3 volts. Since terminal X is connected to the collector electrode of transistor $Q_2$, this more positive level applied to the associated driver circuit energizes phases C and D of the stepping motor.

The turning on of transistor $Q_1$ and the resultant negative-going pulse on its collector electrode which is coupled to the base of transistor $Q_3$, causes this last transistor to turn off. This cessation of conduction in $Q_3$ occurs very rapidly because the voltage stored in capacitor 22 is discharged through the now forward biased diode 24. The positive-going voltage on the collector of transistor $Q_2$ is applied to the previously nonconducting transistor $Q_4$. However, since capacitor 20 coupled to the base of transistor $Q_4$ has previously been charged to −11.2 volts, a finite time determined by the values of resistor 26 and capacitor 20 will be required before capacitor 20 (which is charging toward −2.3 volts) reaches a potential which will bias transistor $Q_4$ to conduction. During the period of charge of capacitor 20, when both transistors $Q_3$ and $Q_4$ are off, the potential of the common collectors of the last-mentioned transistors rises from about −5.4 volts to ground potential. In an actual embodiment, the time period when both transistors $Q_3$ and $Q_4$ are off is about 80 microseconds, so that a pulse of approximately 5 volts in amplitude and 80 microseconds duration appears on the common collectors thereof. On the positive-going slope of this pulse, which is also applied to the base of transistor $Q_5$, this last transistor is turned on. The emitter of transistor $Q_5$ rises from −6 volts to approximately ground potential. This conduction has no appreciable effect on transistor $Q_6$ which continues in a conducting state. However, on the negative-going slope of the pulse on the collectors of transistors $Q_3$ and $Q_4$, coincident with the conduction of transistor $Q_4$, transistor $Q_5$ is again turned off. The emitter of transistor $Q_5$ goes from ground potential to −6 volts, and this negative-going change in potential is transmitted to the base of transistor $Q_6$ via capacitor 28 which had been charged to approximately −60 volts. Transistor $Q_6$ is turned off by this negative "transient" and will remain off for a period of time dependent upon the amplitude of the negative pulse and the RC time constant of variable resistor 30, resistor 32 and capacitor 28. Obviously, the variable resistor 30 allows for the adjustment of the time during which transistor $Q_6$ is off. For the period that transistor $Q_6$ is nonconducting, transistor $Q_7$ is biased to conduction. This is illustrated in the timing waveform of FIG. 8, where the conduction of transistor $Q_7$ and the resultant change in voltage potential on its emitter (which is coupled to terminal Z) from −60 volts to −42 volts is present for approximately 14 milliseconds between the times $t_{1a}$ and $t_2$. (The period from $t_1$ to $t_{1a}$ is that during which $Q_3$ and $Q_4$ are both off and $Q_5$ is conducting. This time period may be of the order of 80 microseconds.) The duration of the pulse on terminal Z may vary from 7 to 17 milliseconds (as adjusted by variable resistor 30) depending upon the unbalanced and frictional loading on the gate member. The psoitive-going pulse on terminal Z is transmitted to the driver circuit, which energizes phases B and C of the stepping motor. With the discharge of capacitor 28, transistor $Q_6$ resumes conduction, and transistor $Q_7$ is again cut off. At this point, phases D and C of the motor remain energized as a result of the level on the X terminal, thereby holding the gate open against the 15° stop.

When it is desired to close the gate, a similar action takes place. The operation is initiated at time $t_3$ in FIG. 8 when the system logic signal applied to terminal T is changed from +5 volts to ground potential. The potential on terminal X goes more negative, resulting in the de-energization of motor phases C and D. Conversely, the potential on terminal Y goes more positive, causing the driver circuits to energize phases A and B. In the pulse generating circuit, comprised of transistors $Q_3$ and $Q_4$, transistor $Q_4$ will now be immediately turned off while the conduction of transistor $Q_3$ will be delayed by the time it takes to charge capacitor 22 to the level needed to bias transistor $Q_3$ to conduction. In a manner similar to that described hereinbefore, transistor $Q_7$ is turned on for the period corresponding to the time transistor $Q_6$ is off, thereby causing the potential on terminal Z to go more positive. This level change on terminal Z effects the energization of phases B and C for the period from $t_{3a}$ to $t_4$. (During the period $t_3$ to $t_{3a}$, which as indicated previously is approximately 80 microseconds, transistors $Q_3$ and $Q_4$ are both nonconducting and transistor $Q_5$ is on.)

The preceding description was primarily concerned with the operation of the amplifier portion of the stepping motor control circuit. Cursory mention only was made that the occurrence of a predetermined output level on the respective amplifier output terminals X, Y and Z causes the associated driver circuit to energize selected stepping motor windings designated respectively A, B, C and D in FIG. 7.

Each pair of parallel-connected transistors, namely $Q_8$, $Q_9$; $Q_{10}$, $Q_{11}$; $Q_{12}$, $Q_{13}$; and $Q_{14}$, $Q_{15}$ comprises a driver circuit. The common collector electrodes of driver transistors $Q_8$ and $Q_9$ are connected to winding A of the stepping motor and also via diode 34 to winding B. Similarly, transistors $Q_{10}$ and $Q_{11}$ have their collector electrodes connected to windings D and C, the latter by way of diode 36. Transistors $Q_{12}$ and -$_{13}$ are arranged to energize winding C, and transistors $Q_{14}$ and $Q_{15}$, to energize winding B. It should be noted that the last-mentioned two pairs of transistors are adapted to be actuated concurrently by a suitable voltage level on output terminal Z.

Considering the same sequence of events chosen previously for purpose of description, initially at time $t_0$, the output level on terminal X is at its most negative amplitude (−11.2 volts) and the level on the Y terminal is at its most positive level (−2.3 volts). The latter level, applied to the base electrode of transistor $Q_8$ causes this transistor to conduct, which results in the biasing on of transistor $Q_9$. Collector current flows through winding A and via diode 34 through winding B. The energization of phases A, B, results in the gate member being held closed at the 0° position. The "negative" level on output terminals X and Z does not permit the conduction of the driver transistors $Q_{10}$, $Q_{12}$ and $Q_{14}$ coupled thereto.

When at time $t_1$ it is desired to open the gate to its 15° position, the aforementioned voltage levels on terminals X and Y are interchanged. Also, as explained previously, at time $t_{1a}$, the level on terminal Z rises in a positive direction from −60 to −42 volts. Transistors $Q_{12}$ and $Q_{13}$ are driven to conduction and winding C is pulsed with more than double its rated current. Concurrently, transistors $Q_{14}$ and $Q_{15}$ are turned on and winding B is also pulsed with a similar amplitude current level. The more "positive" level on terminal X causes transistors $Q_{10}$ and $Q_{11}$ to conduct and to energize winding D. The latter transistors do not contribute to the current flow in winding C at this time because diode 36 is reverse-biased. The actuation of phase D during the pulsing of B and C, tends to compensate for unbalanced forces in the manner explained previously.

As the torque on the gate member supplied by phases B and C becomes 0 in the direction of gate opening and starts increasing in the reverse direction, the velocity of the gate member also approaches 0. Thus at time $t_2$, the level on terminal E goes negative, turning off transistors $Q_{12}$, $Q_{13}$, $Q_{14}$ and $Q_{15}$ and current is no longer supplied to phases B and C therefrom. However, while the energization of phase B is terminated at time $t_2$, phase C is energized with rated current supplied by transistors $Q_{10}$ and $Q_{11}$. Phases C and D are thus active to bring the gate to rest and hold it at the 15° stop.

In the movement of the gate from the 15° stop to the 0° position, at time $t_3$, terminal Y goes more "positive"; terminal X, more "negative". At time $t_{3a}$, terminal Z goes more "positive" and a high level energizing current pulse flows through windings B and C for the period from time $t_{3a}$ to $t_4$. Winding A is also energized by virtue of the level on terminal Y. Transistors $Q_8$ and $Q_9$ supply no current to winding B at this time bacause diode 34 is back-biased. The energization of winding A concurrent with windings B and C corrects for unbalanced forces in the travel from 15° position to the 0° position. Beyond the 7.5° position, as the gate velocity diminishes in response to the now reverse torque created by phases B and C, the energization of the latter are terminated at time $t_4$. Phase A remains energized, and phase B is now energized at rated current by transistors $Q_8$ and $Q_9$. The gate is moved to the 0° position and is held there, until a subsequent pulse on terminal T from the system logic dictates the opening of the gate.

Diodes 38 associated with each of the motor windings serve to eliminate the inductively generated oscillatory effects normally associated with the abrupt cessation of current flow through the windings.

In conclusion, the inventive concepts and implementations described herein have proved highly satisfactory in actual operative systems. However it should be understood that changes and modifications thereof may be needed to suit particular requirements. Such changes and modifications, insofar as they are not departures from the true scope of the invention, are intended to be covered by the claims appended hereto.

What is claimed is:

1. The method of operating a multi-phase stopping motor such that the rotation of its rotor is confined between a pair of prescribed limits which comprises:

placing a physical stop at each of said limits arranged to prevent said rotor from attaining the rest position beyond the limit toward which it is being moved by an applied torque, energizing at least a first of the multi-phase windings with a high level current to generate a torque capable of accelerating the rotor of said motor from one of its limits toward the opposite limit, positioning the stator housing of said motor so tha the torque generated by said high level current diminishes as the rotor approaches the midpoint of travel between said limits, reaches a null substantially at said midpoint, and increases in the reverse direction beyond said midpoint, terminating said high level current substantially at the time the reverse direction torque causes the rotor to approach zero velocity, energizing at least a second of the multi-phase windings with a low level current to generate a torque capable of moving the rotor toward the rest position beyond said opposite limit and to cause it to reach said opposite limit and to hold it at said limit.

2. The method of operating a multi-phase motor as defined in claim 1 including the additional step of:

energizing at least a predetermined one of said multi-phase windings concurrently with the energization of at least said first of the multi-phase windings to compensate for external unbalanced forces.

3. The method of operating a four-phase stepping motor having phases designated A, B, C and D such that the rotation of its rotor is confined between a pair of prescribed limits which comprises:

placing a physical stop at each of said limits arranged to prevent said rotor from attaining the rest position beyond the limit toward which it is being moved by an applied torque, energizing phases B and C with an above-rated current level to generate a torque capable of accelerating the rotor of said motor from one of its limits toward the opposite limit, positioning the stator housing of said motor so that the torque generated by phases B and C diminishes as the rotor approaches the midpoint of travel between said limits, reaches a null substantially at said midpoint, and increases in the reverse direction beyond said midpoint, terminating the energization of phases B and C at the time the reverse direction torque causes the rotor to approach zero velocity, selectively energizing one of the pair of phases C and D and A and B with a rated current to generate a torque in the proper direction to move the rotor toward the rest position beyond said opposite limit and to cause it to reach said opposite limit and to hold it at said limit.

4. The method of operating a four-phase stepping motor as defined in claim 3 including the additional step of:

selectively energizing one of the phases D and C concurrent with the energization of phases B and C to generate a compensating torque capable of overcoming the effects of external unbalanced torque.

5. A control system for use with a stepping motor having multi-phase windings for operating said motor between a pair of prescribed limit positions comprising, a physical stop operatively arranged at each of said limit positions to prevent the rotor of said motor from attaining the rest position beyond the limit position toward which it is being moved by an applied torque, first means coupled to at least a first of said multi-phase windings for causing a high level current to flow therethrough, said high level current applying an accelerating torque to said rotor to cause it to move from one of its limit positions toward its opposite limit position, the stator housing of said motor being oriented such that the torque generated by said high level current diminishes as the rotor approaches the midpoint of the travel between said limit positions and is at a null substantially at said midpoint, said last-mentioned torque increasing in a reverse direction beyond said midpoint whereby the velocity of said rotor is diminished and approaches zero as the rotor approaches said opposite limit position, said first means terminating said high level current flow substantially at the time said rotor attains said zero velocity condition, second means coupled to at least a second of said multi-phase windings and being effective upon the termination of said high level current for causing a low level current to flow therethrough, said low level current applying an accelerating torque to said rotor in a direction to cause it to move toward the rest position beyond said opposite limit position and to reach said last mentioned position and to hold it there.

6. A control system as defined in claim 5 wherein said rotor is coupled to a gate member, said gate member being operatively arranged to contact said physical stops at said limit positions whereby the motion of said member is confined between said stops.

7. A control system as defined in claim 6 wherein said stator housing is oriented such that the null point of the torque generated by said high level current is displaced a predetermined angular distance from the midpoint of the travel limits to overcome the effects of the external torque on said gate member.

8. A control system as defined in claim 6 wherein said second means is further adapted to cause a low level current to flow through at least a predetermined one of said multi-phase windings concurrent with the flow of said high level current through at least said first of said windings, in order to compensate for external forces which cause an unbalanced torque to be impressed upon said gate member.

9. A control system for use with a stepping motor having four phase windings designated respectively A, B, C and D for operating said motor between a pair of prescribed limits comprising,
 a physical stop operatively arranged at each of said limits to prevent the rotor of said motor from attaining the rest position beyond the limit toward which it is being moved by an applied torque,
 first driver means for causing above-rated current to flow through said B and C windings, said last-mentioned current applying an accelerating torque to said rotor to cause it to move from one of said limits toward its opposite limit, the stator housing of said rotor being oriented such that the torque generated by said current flow through windings B and C diminishes as the rotor approaches the midpoint of travel between said limits and reaches a null substantially at said midpoint, said last-mentioned torque increasing in a reverse direction beyond said null whereby the velocity of said rotor is diminished and approaches zero as the rotor approaches said opposite limit,
 said first driver means terminating said above-rated current flow through windings B and C substantially at the time of attainment of said zero velocity condition,
 second and third driver means capable of causing rated currents to flow through the respective pairs of winding, A, B, and C, D, said rated currents generating oppositely directed torques, means responsive to the desired direction of motor operation and effective upon the termination of said above-rated current through windings B and C for selectively activating one of said second and third driver means, the selected one of said last-mentioned means causing a torque to be generated in the proper direction to move said rotor toward the rest position beyond said opposite limit and to reach said opposite limit and to maintain it at said limit.

10. A control system as defined in claim 9 wherein said second and third driver means are adapted to cause current flow respectively in windings D and C concurrent with the flow of said above-rated current through windings B and C, said selected one of said second and third driver means thereby causing a torque to be generated which will compensate for external unbalanced forces operating upon said rotor.

11. A control system as defined in claim 10 wherein said second driver means is coupled directly to said winding A and by way of a first diode to winding B, and said third driver means is coupled directly to said winding D and by way of a second diode to winding C, the energization of windings B and C by said third driver means reverse-biasing said first and second diodes thereby precluding said second and third driver means from supplying current respectively to windings B and C while said third driver means is active.

12. A control system as defined in claim 11 wherein said means for selectively activating said second and third driver means comprises amplifier means adapted to receive signals from an external source and being responsive to said signals for activating and controlling appropriate ones of said first, second, and third driver means.

13. A control system as defined in claim 12 wherein said amplifier means comprise a plurality of current amplifying devices,
 a first and second of said devices being normally in opposite states of conduction, said signals from said external source being applied to said first device and determining at any given time the respective conductive states of said devices, said first and second devices being coupled respectively to said second and third driver means, the selective actuation of one of the latter driver means being a function of the conductive states of said last-mentioned devices,
 a third and fourth of said devices, resistive/capacitive means coupling said third and fourth devices respectively to said first and second devices, the conductive states of said former devices being dependent upon the conductive states of the latter devices,
 a fifth of said devices coupled in common to said third and fourth devices and being normally biased to nonconduction as a result of the conduction of either one of said last-mentioned devices,
 a resistive/capacitive network coupling a sixth of said devices to said fifth device, said sixth device being normally biased to a conductive state,
 a seventh of said devices coupled to said sixth device and having a conducting state opposite to and controlled by the state of said sixth device, said seventh device being coupled to said first driver means,
 the switching of conductive states in said first and second devices in response to said external signal causing a transient condition associated with and limited in time by said resistive/capacitive means wherein both said third and fourth devices are driven to a nonconducting state, said fifth device assuming a conducting state during the period of said transient condition, the cessation of said condition effected by the conduction of one of said third or fourth devices terminating the conduction of said fifth device, said sixth device being driven to a nonconducting state in response to said last-mentioned termination of conduction and remaining in this state for a period determined by the time-constant of said resistive/capacitive network associated therewith, said seventh device being biased to a conducting state during said period, said first driver means being activated in response to said conducting state in said seventh device and remaining activated until the resumption of conduction by said sixth device.

14. A control system as defined in claim 13 wherein said current amplifying devices are transistors.

15. A control system for use with a stepping motoro having multi-phase windings comprising,
 a plurality of current driver means coupled respectively to predetermined ones of said windings, amplifier means adapted to receive signals from an external source and being responsive to said signals for acivating and controlling appropriate ones of said driver means, said maplifier means comprising a plurality of current amplifying devices, a first and second of said devices being normally in opposite states of conduction, said signals from said external source being applied to said first device and determining at any given time the respective conductive states of said devices, said first and second devices being coupled respectively to a first and a second of said driver means, the selective actuation of one of the latter driver means being a function of the conductive states of said last-mentioned devices, a third and a fourth of said devices, resistive/acapcitive means coupling said third and fourth devices respectively to said first and second devices, the conductive states of said former devices being dependent upon the conductive states of the latter devices, a fifth of said devices coupled in common to said third and fourth devices and being normally biased to nonconduction as a result of the conduction of either one of said last-mentioned devices, a resistive/capacitive network coupling a sixth of said devices to said fifth device, said sixth device being normally biased to a conductive state, a seventh of said devices coupled to said sixth device and having a conductive state opposite to and controlled by the state of said sixth device, said seventh device being coupled to a third of said driver means, the switching of conductive states in said fist and second devices in response to said external signal causing a transient condition associated with and limited in time by said resistive/capacitive means wherein both said third and fourth devices are driven to a nonconducting state, said fifth device assuming a conducting state during the period of said transient condition, the cessation of said condition effected by the conduction of one of said third or fourth devices terminating the conduction of said fifth device, said sixth device being driven to a nonconducting state in response to said last-mentioned termination of conduction and remaining in this state for a period determined by the time-constant of said resistive/capacitive network associated therewith, said seventh device being biased to a conducting state during said period, said third driver means being activated in response to said conducting state in said seventh device and remaining activated until the resumption of conduction by said sixth device.

16. A control system as defined in claim 15 wherein each of said first and second driver means is coupled directly to at least one of said windings and by way of a diode to at least another of said windings, said diode being poled to prevent current flow through said last-mentioned winding provided by said first and second driver means when said winding is energized by said third driver means.

* * * * *

UNITED STATES PATENT OFFICE
CERTIFICATE OF CORRECTION

Patent No. 3,755,727          Dated August 28, 1973

Inventor(s) Italo H. Schifalacqua

It is certified that error appears in the above-identified patent and that said Letters Patent are hereby corrected as shown below:

Column 4, line 27, in the equation "$\pm \pi 16$" should read --$\pm \pi/6$--; line 33, "$I=E_{in}/R (1 -e(R/t))$" should read $$I = \frac{E_{in}}{R}\left(1 - e^{-\frac{R}{L}t}\right)$$

Column 5, line 22, "301" should read --.301--; line 63, delete "v,35/10"; Column 6, line 30, "$J_s\theta + F_s\theta + K\theta = \theta$" should read --$J_s\ddot{\theta} + F_s\dot{\theta} + K\theta = 0$--;   Column 6, line 67, after "7.5°" insert --as seen in Figure 3 the torque is zero, and beyond 7.5°,--; Column 10, line 17, after "is" insert --off. The--; line 19, after "transistor $Q_4$" delete "is nonconducting"; Column 12, line 10, "$_{-13}$" should read --$Q_{13}$--.

Signed and sealed this 6th day of August 1974.

(SEAL)
Attest:

McCOY M. GIBSON, JR.
Attesting Officer

C. MARSHALL DANN
Commissioner of Patents